United States Patent
Deng (10) Patent No.: US 12,210,961 B2
(45) Date of Patent: Jan. 28, 2025

(54) INTELLIGENT PROCESSOR, DATA PROCESSING METHOD AND STORAGE MEDIUM

(71) Applicant: Xiamen SigmaStar Technology Ltd., Fujian (CN)

(72) Inventor: Yaming Deng, Fujian (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 962 days.

(21) Appl. No.: 17/227,468

(22) Filed: Apr. 12, 2021

(65) Prior Publication Data

US 2022/0067495 A1 Mar. 3, 2022

(30) Foreign Application Priority Data

Aug. 28, 2020 (CN) .......................... 202010883908.7

(51) Int. Cl.
G06F 9/30 (2018.01)
G06N 3/063 (2023.01)

(52) U.S. Cl.
CPC .......... G06N 3/063 (2013.01); G06F 9/30036 (2013.01)

(58) Field of Classification Search
CPC ........ G06N 3/063; G06N 3/045; G06N 3/048; G06N 20/00; G06F 9/30036
See application file for complete search history.

(56) References Cited

U.S. PATENT DOCUMENTS

| | | | | |
|---|---|---|---|---|
| 10,762,164 B2* | 9/2020 | Chen | ...................... | G06F 7/4873 |
| 11,334,796 B2* | 5/2022 | Das | ........................ | G06F 7/5443 |
| 11,429,394 B2* | 8/2022 | Valliappan | .............. | G10L 15/22 |
| 11,507,817 B2* | 11/2022 | Abdelaziz | ........... | G06F 9/30101 |
| 2022/0066776 A1* | 3/2022 | Stevens | ................... | G06F 9/324 |

* cited by examiner

*Primary Examiner* — Corey S Faherty
(74) *Attorney, Agent, or Firm* — Edell, Shapiro & Finnan, LLC (57) ABSTRACT

An intelligent processor includes a first operation unit and a second operation unit. The first operation unit acquires first input data corresponding to a first operator, divides the first input data into multiple sets of first sub input data, and operates the first operator to perform an operation on the first sub input data to obtain first sub output data corresponding to each set of first input data. The second operation unit uses the first sub output data as second input data of the second operator, and operates the second operator to perform an operation on the second input data to obtain second output data corresponding to each set of second input data. Thus, the second operator need not wait until the first operator finishes all operations of the first input data, allowing two adjacent operator to achieve partial parallel calculation and improving operation efficiency.

13 Claims, 7 Drawing Sheets

INTELLIGENT PROCESSOR, DATA PROCESSING METHOD AND STORAGE MEDIUM

This application claims the benefit of China application Serial No. CN 202010883908.7, filed Aug. 28, 2020, the subject matter of which is incorporated herein by reference.

BACKGROUND OF THE INVENTION

Field of the Invention

The invention relates to the technical field of artificial intelligence, and more particularly to an intelligent processor, a data processing method and a storage medium.

Description of the Related Art

Artificial intelligence (AI) is the theory, method, technology and application system that use digital computers or machines controlled by digital computers to simulate, extend and expand human intelligence, sense the environment, acquire knowledge, and use knowledge to obtain optimal results. In other words, AI is a comprehensive technology of computer science; it aims to understand the essence of intelligence and produces a novel intelligent machine capable of reacting in a way similar to human intelligence. That is, AI is the study of design principles and implementation methods of various intelligent machines, so that the machines have functions of perception, reasoning and decision-making.

The AI technology is a comprehensive subject that involves an extensive range of fields, including both hardware-level techniques and software-level techniques. The fundamental techniques of AI commonly include technologies such as sensors, dedicated AI chips, cloud computing, distributed storage, big data processing techniques, operation/interaction systems and mechatronics. Software techniques of AI primarily include several main directions such as computer visual techniques, voice processing techniques, natural language processing techniques and machine learning/deep learning.

Among the above, machine learning (ML) is a multidisciplinary and interdisciplinary field that involves multiple disciplines including probability theory, statistics, approximation theory, convex analysis, algorithm complexity theory. Machine learning is dedicated to studies of how computers simulate or realize learning behaviors of human so as to acquire new knowledge or skills, and re-organize existing knowledge structures and hence constantly improve self performance. Machine learning is the core of artificial intelligence and a fundamental route that provides computers with intelligence, and is extensively applied in various fields of artificial intelligence. Machine learning and deep learning usually include artificial neural networking, belief networking, reinforcement learning, transfer learning, and inductive learning techniques. Using machine learning techniques and corresponding training data sets, training can be performed to achieve network models of different functions. For example, training can be performed based on a training data set to obtain a network model for gender classification, and training can be performed based on another training data set to obtain a network model of image optimization.

With the constant development of the AI technology, network models are deployed on electronic apparatuses including smartphones and tablet computers to reinforce the processing capacity of the electronic apparatuses. For example, an electronic apparatus is allowed to optimize a captured image thereof using a deployed image optimization model to enhance image quality.

Figure 1:
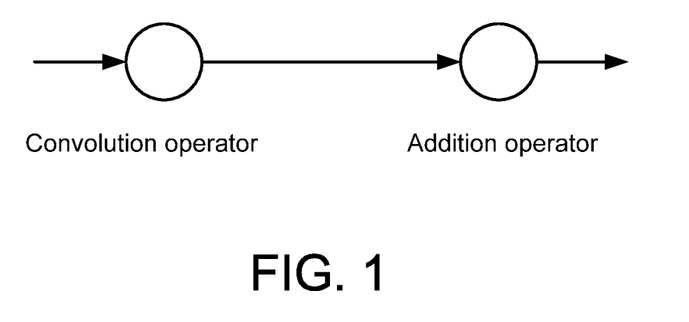
FIG. 1 is a schematic diagram of two adjacent operators in the related art.
Figure 2:
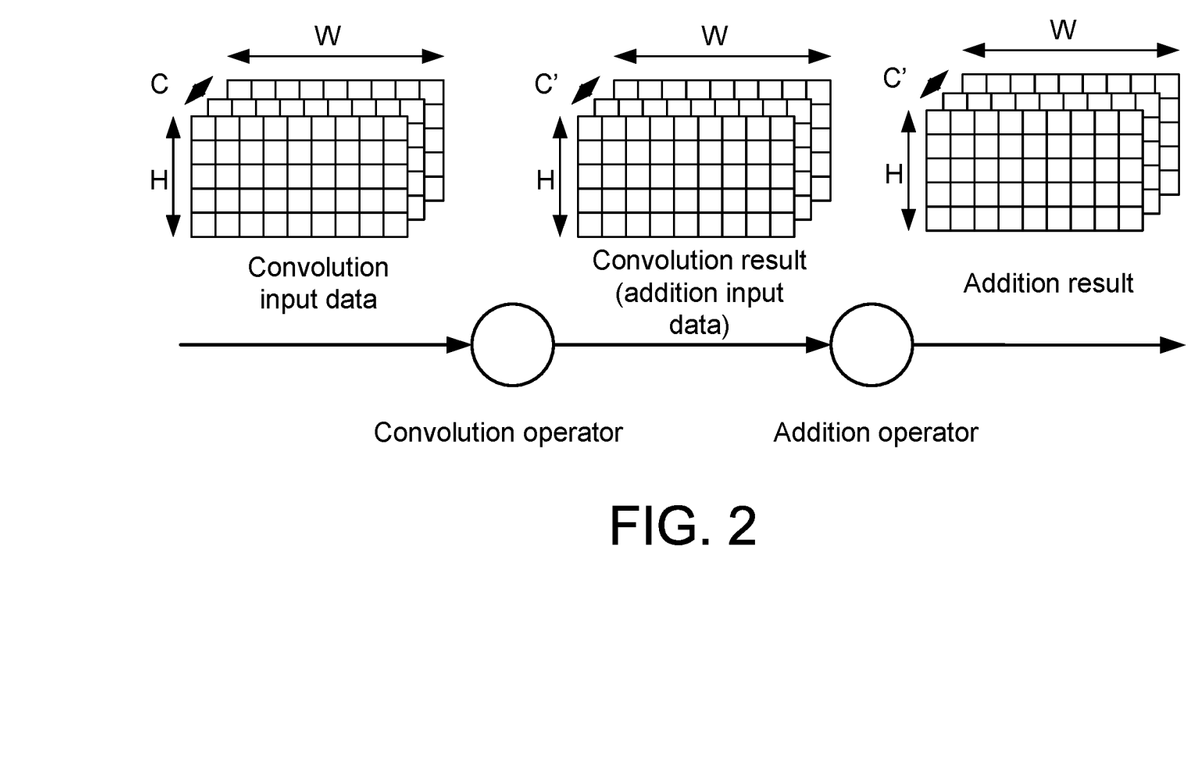
FIG. 2 is a schematic diagram of serial operations performed by two adjacent operators in operation logic of a convolutional network model.

In related techniques, with respect to the operation logic of a network model for serial operations of two adjacent operators in the network model, an output result of a completed operation of the former operator is used as an input of the latter operator, and the latter operator relies on the output of the former operator. For example, referring to FIG. 1 showing a convolution operator and an addition operator that are adjacent in a convolutional network model, with respect to the operation logic of the convolutional network model, the convolution result of the convolution operator is used as the input data of the addition operator, and the addition operator relies on the output result of the convolution operator. In an actual operation, the addition operator needs to wait until the operation of the convolution operator is complete before it can perform addition according to the convolution result of the convolution operator. As shown in FIG. 2, the addition operator needs to wait until the convolution operator completes the convolution operation on C channels of convolution input data having a height of H and a width of W to obtain a convolution result in C' channels each having a height of H, a width of W, and can then use the convolution result in C' channels each having a height of H, a width of W as input data to perform addition to obtain an addition result in C' channels each having a height of H, a width of W. It is seen that, the forced waiting between adjacent operands severely slackens the operation efficiency of the network model.

From a topology perspective, a network model consists of different types of operators, and for serial operations of adjacent operators, i.e., the latter operator relying on the operation result of the former operator, such serial structure results in forced waiting and demotes improvement in the operation efficiency of the network model. Therefore, the present application provides an intelligent processor, and a data processing method for improving operation efficiency of a network model.

SUMMARY OF THE INVENTION

The present application provides an intelligent processor, a data processing method and a storage medium for improving operation efficiency of a network model.

An intelligent processor provided by the present application includes a first operation unit and a second operation unit. The first operation unit acquires first input data corresponding to a first operator, divides the first input data into a plurality of sets of first sub input data, and operates the first operator to perform an operation on each of the sets of first sub input data to obtain a set of first sub output data corresponding to each of the sets of first sub input data. The second operation unit uses each of the sets of first sub output data as a set of second input data of a second operator, and operates the second operator to perform an operation on each of the sets of second input data to obtain a set of second output data corresponding to each of the sets of second input data.

A data processing method provided by the present application is applied to an intelligent processor, which includes a first operation unit and a second operation unit. The data processing method includes: the first operation unit acquiring first input data corresponding to a first operator, and dividing the first input data into a plurality of sets of first sub input data; the first operation unit operating the first operator to perform an operation on each of the sets of first sub input data to obtain a set of first sub output data corresponding to each of the sets of first sub input data; the second operation unit using each of the sets of first sub output data as a set of second input data of a second operator; and the second operation unit operating the second operator to perform an operation on each of the sets of second input data to obtain a set of second output data corresponding to each of the sets of second input data.

A storage medium provided by the present application has a computer program stored therein. The computer program is configured to perform a data processing method, the data processing method is applied to an intelligent processor, and the intelligent processor includes a first operation unit and a second operation unit. The data processing method includes: the first operation unit acquiring first input data corresponding to a first operator, and dividing the first input data into a plurality of sets of first sub input data; the first operation unit operating the first operator to perform an operation on each of the sets of first sub input data to obtain a set of first sub output data corresponding to each of the sets of first sub input data; the second operation unit using each of the sets of first sub output data as a set of second input data of a second operator; and the second operation unit operating the second operator to perform an operation on each of the sets of second input data to obtain a set of second output data corresponding to each of the sets of second input data.

In the foregoing intelligent processor, the data processing method and the storage medium, the second operator is capable of implementing parallel calculation with the first operator on different small blocks of input data without having to wait until the first operator completes all operations of the first input data. Thus, using different operation units, two adjacent operators are allowed to achieve partial parallel calculation to a certain extent, thereby achieving the object of improving operation efficiency of a network model.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

It should be noted that, an example of implementing the principle of the present application in an appropriate operation environment is described below. The description below is an example of a specific embodiment of the present application, and is not to be construed as limitations to other specific embodiments of the present application that are not described herein.

The present application provides an intelligent processor, a data processing method and a storage medium for improving operation efficiency of a network model.

The solution provided by embodiments of the present application relates to machine learning techniques of artificial intelligence (AI), and specifically relates to an operation stage of a network model—associated details are given in the embodiments below.

Figure 3:
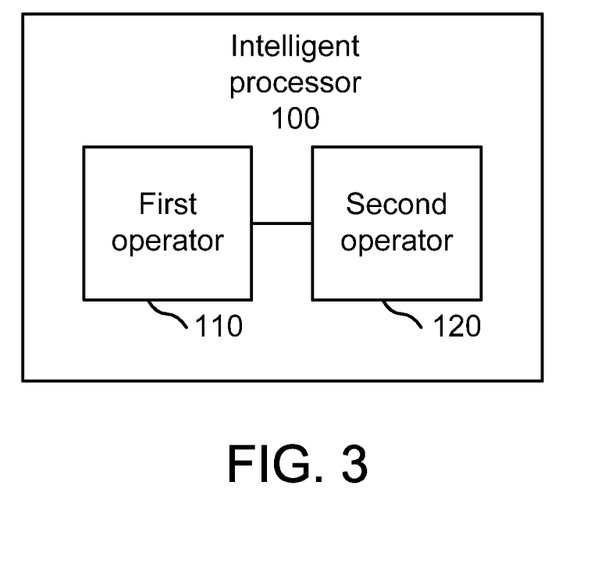
FIG. 3 is a structural schematic diagram of an intelligent processor 100 according to an embodiment of the present application.

Referring to FIG. 3, FIG. 3 shows a first structural schematic diagram of an intelligent processor 100 provided according to an embodiment of the present application. The intelligent processor 100 may include a first operation unit 110 and a second operation unit 120 connected to each other.

It should be noted that, the first operation unit 110 and the second operation unit 120 are different types of hardware operation units (or referred to as hardware engines, or operation acceleration units). For example, when the first operation unit 110 is a convolution operation unit, the second operation unit 120 is a vector operation unit; for another example, when the first operation unit 110 is a vector operation unit, the second operation unit 120 is a convolution operation unit.

A convolution operation unit is also referred to as a convolution calculation engine, and may include therein multiple multiply-add (MAC) units. The number of MAC units may be in several thousand. For example, the convolution operation unit may include therein 4096 MAC units, which may be further divided into 16 cells, each of which being capable of performing a vector inner product operation with a maximum element number of 256.

A vector operation unit is also referred to as a single instruction multiple data (SIMD) processing unit. The vector operation unit is an element-level vector calculation engine capable of processing arithmetic operations such as addition, subtraction, multiplication and division between vectors, and is also capable of performing bit-level logic operations such as AND, OR, NOT and exclusive. Further, the vector operation unit supports common activation function operations such as rectified linear unit (ReLU) and PReLU.

In an embodiment of the present application, the first operation unit 110 acquires input data corresponding to the first operator, as first input data, i.e., data needed for an operation of the first operator.

The first operator may be any type of operator operable by the first operation unit 110. For example, when the first operation unit 110 is a convolution operation unit, the first operator may be a convolution operator; for another example, when the first operation unit 110 is a vector operation unit, the first operator may be an addition operator, a subtraction operator, a multiplication operator, a division operator or an activation operator.

After acquiring the first input data corresponding to the first operator, the first operation unit 110 divides the first input data into a plurality of sets of first sub input data according to a configuration data division policy.

It should be noted that, the configuration of a data division policy is not specifically defined, and the configuration may be performed by a person skilled in the art according to actual requirements.

Figure 4:
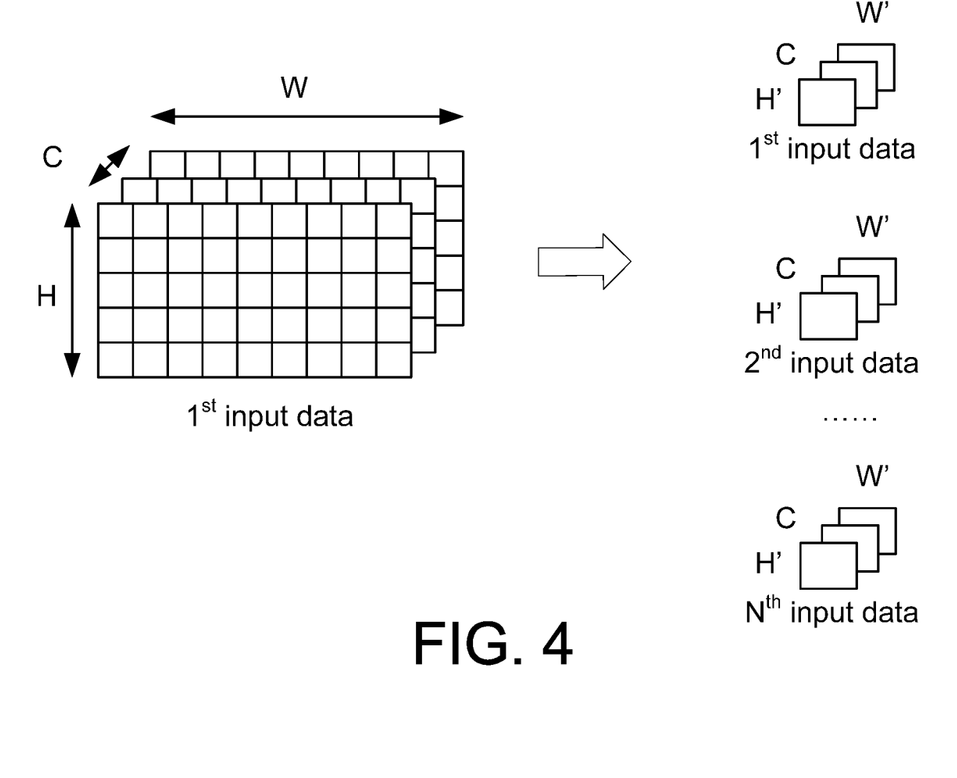
FIG. 4 is a schematic diagram of dividing first input data into N sets of sub input data according to an embodiment of the present application.

For example, referring to FIG. 4, assume that the first operation unit 110 is a convolution operation unit and the first operator is a convolution operator. As shown in FIG. 4, first input data in C channels having a height of H and a width of W is acquired, and the first operation unit 110 divides the first input data to obtain N sets of C channels of first sub input data having a height of H' and a width of W.

After dividing the first input data corresponding to the first operator into the plurality of sets of first sub input data, the first operation unit 110 operates the first operator to perform an operation on each of the sets of divided first sub input data to correspondingly obtain output data corresponding to each of the sets of first sub input data, as first sub output data.

It should be noted that, the order according to which the first operation unit 110 operates the first operator to perform the operations on individual sets of first sub input data is not specifically defined, and may be configured by a person skilled in the art according to actual requirements.

In an embodiment of the present application, the second operator may be any type of operator operable by the second operation unit 120. For example, when the second operation unit 120 is a convolution operation unit, the second operator may be a convolution operator; for another example, when the second operation unit 120 is a vector operation unit, the second operator may be an addition operator, a subtraction operator, a multiplication operator, a division operator or an activation operator. It should be noted that, the first operator and the second operator in an embodiment of the present application belong to the same network model and are adjacent. For example, when the first operation unit 110 is a convolution operation unit and the second operation unit 120 is a vector operation unit, the first operator may be a convolution operator in a convolutional network model, and the second operator may be an addition operator adjacent to the convolution operator in the same convolutional network model.

Once the first operation unit 110 finishes operating the first operator and performing an operation on the first sub input data and obtains the first sub output data corresponding to the first sub input data, the second operation unit 120 uses the first sub output data obtained from the first operation unit 110 as input data of the second operator, and more specifically, as a set of second input data. Then the second operation unit 120 operates the second operator to perform an operation on the second input data to correspondingly obtain a set of second output data corresponding to the second input data.

It is known from the above that, the intelligent processor provided by the present application includes different operation units, which are respectively a first operation unit and a second operation unit. The first operation unit acquires first input data corresponding to a first operator, divides the first input data into a plurality of sets of first sub input data, and operates the first operator to perform an operation on each of the sets of first sub input data to obtain a set of first sub output data corresponding to each of the sets of first sub input data. The second operation unit uses each of the sets of first sub output data as a set of second input data of the second operator, and operates the second operator to perform an operation on each of the sets of second input data to obtain a set of second output data corresponding to each of the sets of second input data. Accordingly, the second operator is capable of implementing parallel calculation with the first operator on different small blocks of input data without having to wait until the first operator completes all operations of the first input data. Thus, using different operation units, two adjacent operators are allowed to achieve partial parallel calculation to a certain extent, thereby achieving the object of improving operation efficiency of a network model.

Optionally, in one embodiment, the second operation unit 120 uses the first sub output data obtained from the first operation unit 110 as the second input data of the second operator each time when the first operation unit 110 obtains the first sub output data.

Each time when the first operation unit 110 obtains the first sub output data, the second operation unit 120 uses the first sub output data obtained from the first operation unit 110 as the second input data of the second operator, and operates the second operator to perform an operation on the second input data to correspondingly obtain the second output data corresponding to the second input data.

For example, assume that the first operation unit 110 divides the first input data into 5 sets of first sub input data, which are first sub input data A, first sub input data B, first sub input data C, first sub input data D and first sub input data E, respectively. The first operation unit 110 operates the first operator to first perform an operation on the first sub input data A to obtain a set of first sub output data A' corresponding to the first sub input data A. At this point, the second operation unit 120 uses the first sub output data A' as the second input data of the second operator, and operates the second operator to perform an operation on the first sub output data A' to obtain the second output data corresponding to the first sub output data A' (i.e., the second input data). While the second operation unit 120 operates the second operator to perform an operation on the first sub output data A', the first operation unit 110 may continue to operate the first operator to perform an operation on the first sub input data B. As such, once the first operation unit 110 finishes operating the first operator and performing an operation on the first sub input data B and hence obtains first sub output data B' corresponding to the first sub input data B, the second operation unit 120 uses the first sub output data B' as the second input data of the second operator, and operates the second operator to perform an operation on the first sub output data B' to obtain the second output data corresponding to the first sub output data B' (i.e., the second input data).

Similarly, once the first operation unit 110 finishes operating the first operator and performing an operation on the first sub input data E and obtains first sub output data E' corresponding to the first sub input data E, the second operation unit 120 uses the first output data E' as the second input data of the second operator, and operates the second operator to perform an operation on the first sub output data E' to obtain the second output data corresponding to the first sub output data E' (i.e., the second input data).

It is seen that, during the process that the first operation unit 110 operates the first operator to perform a block operation on the first input data, the second operation unit 120 operates the second operator to perform an operation on the block operation result of the first operator, enabling the first operator and the second operator to achieve parallel calculation on different data blocks; once the first operator finishes the operation on the first input data, the second operator soon finishes the subsequent operation. Thus, the overall operation efficiency of the network model is improved.

Optionally, in one embodiment, the second operation unit 120 uses the first sub input data obtained from the first operation unit 110 as the second input data of the second operator when the data amount of the first sub output data reaches a predetermined data amount.

It should be noted that, a minimum data amount is required in an operation of an operator, that is, a prerequisite of a normal operation of an operator is providing data in a data amount sufficient for the operation. Thus, a predetermined data amount is configured in an embodiment of the present application to constrain the data amount of an operation performed by the second operator. The value of the predetermined data amount in the embodiment of the present application is not specifically defined, and the predetermined data amount greater than the minimum data amount of an operation performed by the second operator may be used as a constraint and may be determined based on an experimental value by a person skilled in the art according to characteristics of the second operator.

In one embodiment of the present application, each time when the first operation unit 110 obtains the first sub output data obtained from the operation, the second operation unit 120 does not directly use the first sub output data obtained from the operation performed by the first operation unit 110 as the second input data of the second operator. Instead, the second operation unit 120 first determines whether the data amount of the first sub output data obtained by the first operation unit 110 has reached the predetermined data amount. If so, the second operation unit 120 uses the first sub output data obtained by the first operation unit 110 as the second input data of the second operator, and further operates the second operator to perform an operation on the second input data to obtain the second output data corresponding to the second input data; if not, similar determination is performed again once the first sub output data is obtained from the next operation performed by the first operation unit 110, until the data amount of the first sub output data obtained by the first operation reaches the predetermined data amount.

Figure 5:
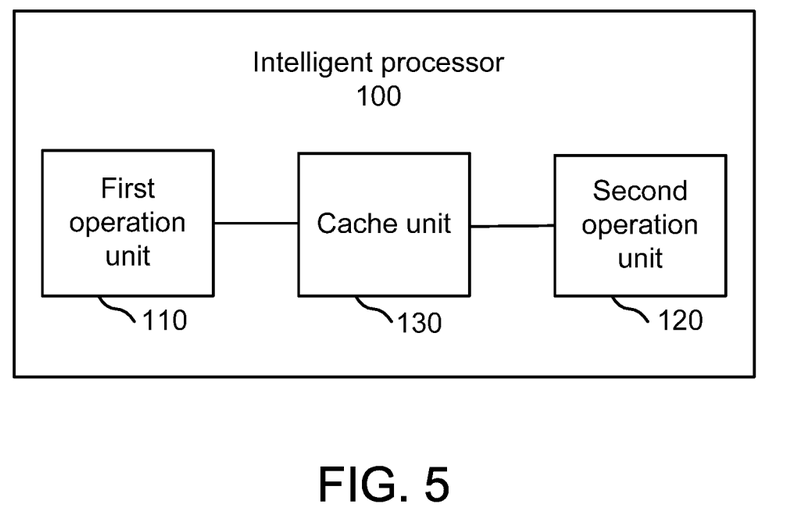
FIG. 5 is another structural schematic diagram of an intelligent processor according to an embodiment of the present application.

Optionally, in one embodiment, referring to FIG. 5, FIG. 5 shows a second structural schematic diagram of an intelligent processor 100 according to an embodiment of the present application. The intelligent processor 100 includes a first operation unit 110, a second operation unit 120 and a cache unit 130. Details of the first operation unit 110 and the second operation unit 120 may be correspondingly referred from the description associated with the first operation unit 110 and the second operation unit 120 in FIG. 3, and are omitted herein.

In one embodiment of the present application, the first operation unit 110 further writes the first sub output data to the cache unit 130, and the second operation unit 120 further reads the first sub output data from the cache unit 130. The first operation unit 110 and the second operation unit 120 do not exchange data directly, but implements data exchange through a third-party component—the cache unit 130.

More specifically, each time when the first operator is operated to perform an operation on first sub input data, the first operation unit 110 writes and temporarily stores the obtained first sub output data corresponding to the first sub input data to the cache unit 130. Each time when the first operation unit 110 obtains and writes the first sub output data to the cache unit 130, the second operation unit 120 reads the first sub output data from the cache unit 130, uses the first sub output data as the second input data of the second operator, and operates the second operator to perform an operation on the second input data to obtain the second output data corresponding to the second input data. Alternatively, each time when the first operation unit 110 obtains and writes the first sub output data to the cache unit 130, the second operation unit 120 determines whether the data amount of the first sub output data obtained by the first operation unit 110 and temporarily stored in the cache unit 130 has reached the predetermined data amount. If so, it means that the first sub output data temporarily stored in the cache unit 130 is sufficient for an operation of the second operation unit 120. At this point, the second operation unit 120 reads the temporarily stored first sub output data from the cache unit 130, as the second input data of the second operator, and further operates the second operator to perform an operation on the second input data to obtain the second output data corresponding to the second input data; if not, similar determination is performed again once the first sub output data of the next operation performed by the first operation unit 110 is obtained, until the data mount of the first output data obtained by the first operation unit 110 reaches the predetermine data amount.

Optionally, in one embodiment, the first operation unit 110 further determines a target division policy corresponding to the first input data according to type information of the first operator, divides the first input data into a plurality of sets of first sub input data according to the target division policy, and writes the first sub input data to the cache unit 130.

It should be noted that, corresponding division policies are configured in advance for different types of operators in an embodiment of the present application.

Correspondingly, to divide the first input data corresponding to the first operator into a plurality of sets of first sub input data, the first operation unit 110 first obtains the type information of the first operator, i.e., identifying which type of operator the first operator is, determines the corresponding division policy according to the type information of the first operator, as a target division policy, and then divides the first input data into a plurality of sets of first sub input data according to the target division policy and writes the first sub input data to the cache unit 130. Accordingly, the first operation unit 110 may read the first sub input data from the cache unit 130, and operate the first operator to perform an operation on the first sub input data to obtain the first sub output data corresponding to the first sub input data.

Optionally, in one embodiment, when the target division policy is determined as a first division policy, the first operation unit 110 determines a first target data size of the divided plurality of sets of first sub input data according to the processing capacity of the first operation unit 110 and a temporary storage space of the cache 130, and divides the first input data into a plurality of sets of first sub input data according to the first target data size and writes the first sub input data to the cache unit 130.

For example, operators are classified into two types in an embodiment of the present application. The first type of operators are operators for operations between vector components and the structure of input data thereof is identical to the structure of the second output data. An operator in the first type is, for example, an addition operator, a subtraction operator, a multiplication operator, a division operator or an activation operator. The second type of operators are non-first type operators, and the structure of input data thereof is different from the structure of the second output data. An operation in the second type is, for example, a convolution operator or a pooling operator.

In one embodiment of the present application, with respect to the first type of operators, it is known from characteristics thereof that, only hardware resource limitations but not features in operation logic of operators need to be taken into account for division of the input data thereof.

Correspondingly, a first division policy is configured for an operation in the first type, and a first target data size of the divided plurality of sets of first sub input data is determined according to the processing capacity of the first operation unit 110 and the temporary storage space of the cache unit 130.

More specifically, the first operation unit 110 determines a maximum data amount of input data operable thereby according to the processing capacity of the first operation unit 110, and determines a maximum data amount storable by the cache unit 130 according to the temporary storage space of the cache unit 130, and uses the maximum data amount storable by the cache unit 130 and the maximum data amount operable by the first operation unit 110 as constraints, such that the maximum data amount operable by the first operation unit 110 is achieved as much as possible under the prerequisite that the divided first sub input data does not exceed the maximum data amount storable by the cache unit 130.

For example, assuming that the maximum data amount operable by the first operation unit 110 is 5, and the maximum data amount storable by the cache unit 130 is 3, it can be determined that the first target data size of the divided first sub input data is 3; for another example, assuming that the maximum data amount operable by the first operation unit 110 is 4, and the maximum data amount storable by the cache unit 130 is 5, it can be determined that the first target data size of the divided first sub input data is 4.

Optionally, in one embodiment, when the target division policy is determined as a second division policy, the first operation unit 110 further determines a second target data size of the divided plurality of sets of first input data according to operation logic of the first operation, and divides the first input data into a plurality of sets of first sub input data according to the second target data size and writes the first sub input data to the cache unit 130.

In one embodiment of the present application, with respect to the second type of operators, it is known from characteristics thereof that, only features in operation logic of operators need to be taken into account for division of the input data thereof.

For example, when the first operator is a convolution operator, the data size of the divided first sub input data is determined according to the data size of the first sub output data operable by convolution and operation logic of the convolution operator. Assuming that the channels of the first sub output data is C, the second target data size of the divided first sub input data is determined by using the width and height of the first sub output data storable to the cache unit 130 as constraints.

For another example, when the first operator is a pooling operator, the data size of the divided first sub input data can be determined according to the size of the filter and the step size of the pooling operator and operation logic of the pooling operator. The filter may be regarded as a rectangular window, for which sliding is performed on the input data according to the step size, and a pooling operation is performed on the data enclosed by the filter; correspondingly, the data size of the data enclosed by the filter is determined as the second target data size.

The present application further provides a chip including a central processor and an intelligent processor. The intelligent processor may be the intelligent processor provided according to any of the embodiments of the present application, and is used to acquire input data needed for an operation from the central processor and return output data obtained from the operation to the central processing unit.

Figure 6:
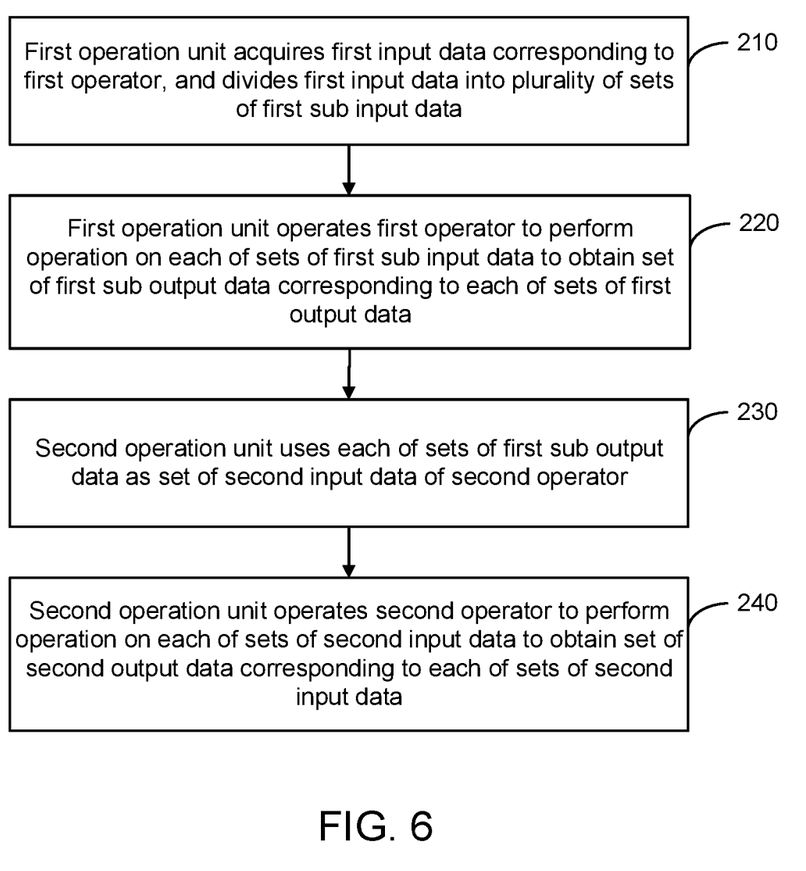
FIG. 6 is a flowchart of a data processing method according to an embodiment of the present application.

The present application further provides data processing method applied to the intelligent processor provided by the present application. Referring to FIG. 6, the flow of the data processing method is as described below.

In step 210, the first operation unit acquires first input data corresponding to a first operator, and divides the first input data into a plurality of sets of first sub input data.

In step 220, the first operation unit operates the first operator to perform an operation on each of the sets of first sub input data to obtain a set of first sub output data corresponding to each of the sets of first sub input data.

In step S230, the second operation unit uses each of the sets of first sub output data as a set of second input data of a second operator.

In step 240, the second operation unit operates a second operator to perform an operation on each of the sets of second input data to obtain a set of second output data corresponding to each of the sets of second sub input data.

Referring to FIG. 3, the data processing method provided by the present application is applicable to, for example, the intelligent processor 100 shown in FIG. 3, and related details can be referred from the description associated with FIG. 3 and are omitted herein.

Optionally, in one embodiment, referring to FIG. 5, the intelligent processor 100 further includes a cache unit 130, and the data processing method provided by the present application further includes: the first operation unit 110 writing the first sub output data to the cache unit 130; and the second operation unit 120 reading the first sub output data from the cache unit 130. Related details can be referred from the description associated with FIG. 5, and are omitted herein.

Figure 7:
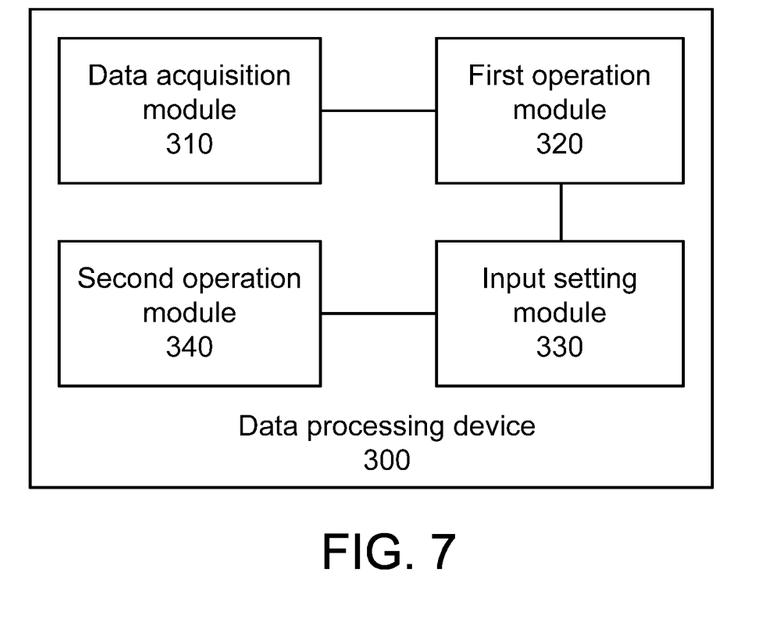
FIG. 7 is a structural schematic diagram of an intelligent processor 300 according to an embodiment of the present application.

Optionally, the present application further provides a data processing device applied to the intelligent processor provided by the present application. The intelligent processor includes a first operation unit and a second operation unit. Referring to FIG. 7, a data processing device 300 includes a data acquisition module 310, a first operation module 320, an input setting module 330 and a second operation module 340. The data acquisition module 310 acquires first input data corresponding to a first operator by the first operation unit, and divides the first input data into a plurality of sets of first sub input data. The first operation module 320 operates the first operator to perform an operation on each of the sets of first sub input data by the first operation unit to obtain a set of first sub output data corresponding to each of the sets of first sub input data. The input setting module 330 uses each of the sets of first sub output data as a set of second input data of a second operator. The second operation module 340 operates the second operator to perform an operation on each of the sets of second input data by the second operation unit to obtain a set of second output data corresponding to each of the sets of second input data.

Optionally, in one embodiment, when each of the sets of first sub output data is used as a set of second input data of a second operator, the input setting module 330 uses the first sub output data as the second input data by the second operation unit each time when the first sub output data is obtained by the first operation unit.

Optionally, in one embodiment, when each of the sets of first sub output data is used as a set of second input data of a second operator, the input setting module 330 uses the obtained first sub output data as the second input data by the second operation unit when a data amount of the first sub output data obtained from the first operation unit has reached a predetermined data amount.

Optionally, in one embodiment, the intelligent processor includes a cache unit, the first operation module 320 further writes the first sub output data to the cache unit by the first operation unit, and the input setting module 330 further reads the first sub output data from the cache unit by the second operation unit.

It should be noted that, with respect to the data processing method of the embodiments of the present application, a person skilled in the art can understand that all or a part of the process of the data processing method of the embodiments of the present application may be completed by means of controlling related hardware using a computer program, wherein the computer program may be stored in a computer-readable storage medium and is capable of performing the process including the data processing method of the embodiments when loaded by an intelligent processor including a first operation unit and a second operation unit. The storage medium may be a magnetic disk, an optical disk, a read-only memory (ROM) or a random access memory (RAM).

The intelligent processor, chip, data processing method, data processing device and storage medium provided according to the embodiments of the present application are as described in detail above. The principle and implementation details of the present application are described by way of specific examples in the literature, and the illustrations given in the embodiments provide assistance to better understand the method and core concepts of the present application. Variations may be made to specific embodiments and application scopes by a person skilled in the art according to the concept of the present application. In conclusion, the disclosure of the detailed description is not to be construed as limitations to the present application.

What is claimed is:

1. An intelligent processor, comprising:
a first operation unit, acquiring first input data corresponding to a first operator, dividing the first input data into sets of first sub input data, and operating the first operator to perform an operation on each of the sets of first sub input data to obtain sets of first sub output data corresponding, respectively, to the sets of first sub input data; and
a second operation unit, using each of the sets of first sub output data as sets of second input data of a second operator, and operating the second operator to perform an operation on each of the sets of second input data to obtain a set of second output data corresponding to each of the sets of second input data.

2. The intelligent processor according to claim 1, wherein the second operator and the first operator belong to a same network model and are adjacent.

3. The intelligent processor according to claim 1, wherein the second operation unit uses the sets of first sub output data as the sets of second input data each time when the first operation unit obtains the sets of first sub output data.

4. The intelligent processor according to claim 1, wherein the second operation unit uses the sets of first sub output data as the sets of second input data each time when a data amount of the sets of first sub output data reaches a predetermined data amount.

5. The intelligent processor according to claim 1, further comprising:
a cache;
wherein, the first operation unit further writes the sets of first sub output data to the cache, and the second operation unit further reads the sets of first sub output data from the cache.

6. The intelligent processor according to claim 5, wherein the first operation unit further determines a target division policy corresponding to the first input data according to type information of the first operator; and divides the first input data into the sets of first sub input data according to the target division policy.

7. The intelligent processor according to claim 6, wherein when the target division policy is a first division policy, a first target data size of divided plurality of sets of first sub input data is determined according to processing capacity of the first operation unit and a temporary storage space of the cache.

8. The intelligent processor according to claim 6, wherein when the target division policy is a second division policy, a second target data size of a divided plurality of first sub input data is determined according to operation logic of the first operator.

9. The intelligent processor according to claim 1, being included in a chip.

10. A data processing method, applied to an intelligent processor, the intelligent processor comprising a first operation unit and a second operation unit, the data processing method comprising:
the first operation unit acquiring first input data corresponding to a first operator, and dividing the first input data into sets of first sub input data;
the first operation unit operating the first operator to perform an operation on each of the sets of first sub input data to obtain sets of first sub output data corresponding, respectively, to the sets of first sub input data;
the second operation unit using each of the sets of first sub output data as sets of second input data of a second operator; and
the second operation unit operating the second operator to perform an operation on each of the sets of second input data to obtain a set of second output data corresponding to each of the sets of second input data.

11. The data processing method according to claim 10, wherein the second operator and the first operator belong to a same network model and are adjacent.

12. The data processing method according to claim 10, wherein the second operation unit uses the sets of first sub output data as the sets of second input data each time when the first operation unit obtains the sets of first sub output data.

13. The data processing method according to claim 10, wherein the second operation unit uses the sets of first sub output data as the sets of second input data each time when a data amount of the sets of first sub output data reaches a predetermined data amount.

* * * * *